Sept. 24, 1968     R. E. MALETTE     3,402,614
SNAP ACTION TOGGLE ASSEMBLIES
Original Filed Oct. 21, 1965
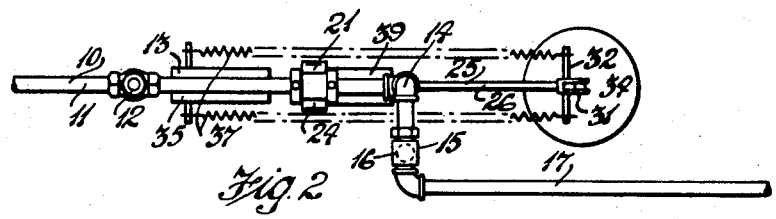
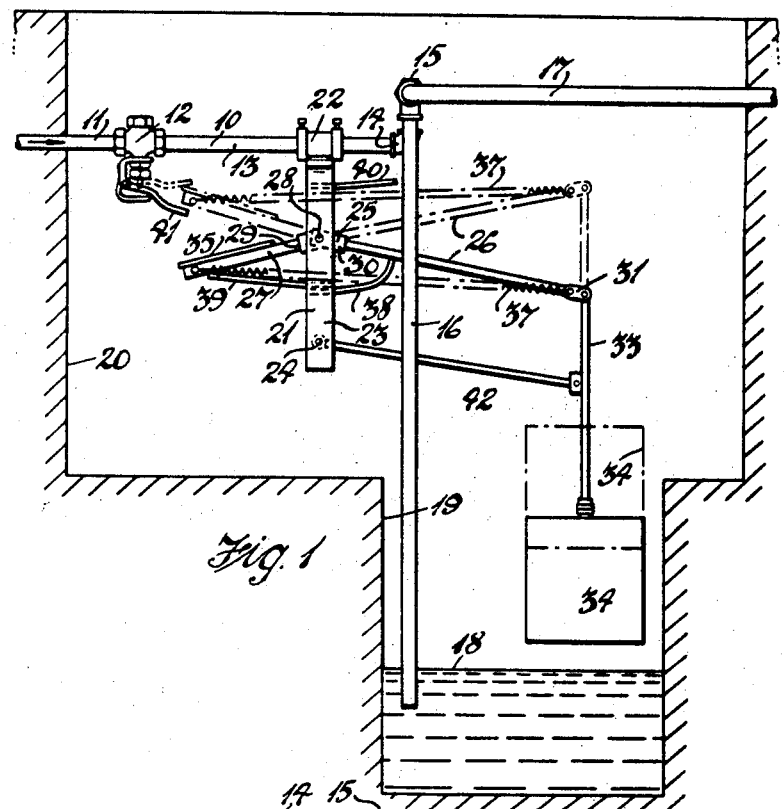
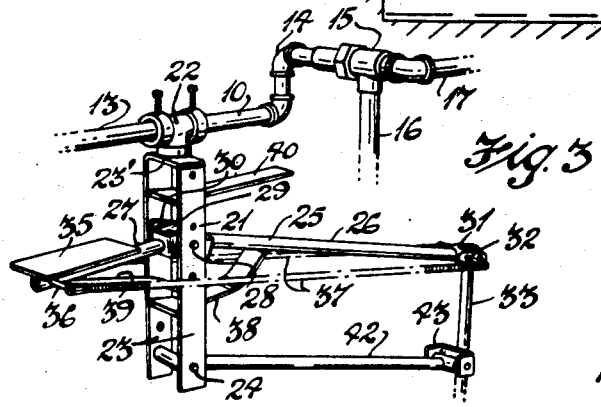
INVENTOR:
R. E. MALETTE
his Atty United States Patent Office 3,402,614
Patented Sept. 24, 1968

3,402,614
SNAP ACTION TOGGLE ASSEMBLIES
Richard E. Malette, Scarborough, Ontario, Canada, assignor to Rem Insulating Systems Limited, Etobicoke, Ontario, Canada
Continuation of application Ser. No. 499,227, Oct. 21, 1965. This application Aug. 4, 1967, Ser. No. 658,578
1 Claim. (Cl. 74—100)

ABSTRACT OF THE DISCLOSURE

Mounted at their co-incident inner ends for limited rotation above and below the horizontal, and about a common pivotal point, upon an elongated vertical support are two oppositely projecting arms. A spring, held in tension extends between the outer ends of said arms. Stop means projecting from the support limit the rotation of the arms under the bias of the spring. A stabilizing link also projects pivotally from one side of the support parallel with and spaced from the arm on the same side. The outer ends of the bar and arm are connected by a rod, and together with the support form a parallelogram.

This is a continuation of application Ser. No. 499,227 filed Oct. 21, 1965, now abandoned.

In broadest conceptual terms, the present invention contemplates the process of utilizing a pressurized conduit system, and particularly an underground insulated fluid conducting piping system having one or more manholes in the length thereof, which consists of connecting to the piping system at the location of each manhole, an open-ended branch conduit having a normally closed valve in the length thereof, an open-ended suction pipe communicating with said branch conduit on the open-ended side of said valve, and associated means within the manhole for opening said valve and permitting pressurized fluid from the piping system to move past the point of communication of said suction pipe with said branch conduit when the lower open end of the suction pipe (which of course is within the manhole and extends downwardly towards the bottom thereof) becomes emersed in water to a pre-determined level, whereby said water is drawn through the suction pipe and discharged with said pressurized fluid through the open end of said branch conduit.

A particular advantage of the inventive new use of a portion of the pressurized fluid in the aforesaid piping system resides in the fact that, without recourse to electric pumps and the like, and hence without the usual expensive maintenance thereof, excess water in the bottom or sump of each manhole may be evacuated and discharged to a convenient remote point.

It should next be explained that the present invention contemplates and comprises a water-level controlling assembly for use within manholes which assembly is designed for use in replacement of conventional, electrically driven sump pumps. The said water level controlling assembly is designed particularly for installation in manholes spaced in the length of underground insulated piping systems of institutional, municipal, or the like nature. It is also contemplated that the inventive concept herein disclosed should be well adapted for domestic installation, as well as for farms and the like.

A particular object and advantage of the present invention is to provide water-level controlling means, and particularly a non-electric sump pump system which is of conspicuously simple and positive-acting mechanical construction; is easy to install and dismantle, should not be liable to break down as is frequently the case with electrically operated sump pumps thereby requiring the services of an electrician, or rendered inoperative due to power failure, and the water evacuating power for which may be obtained from an associated steam, water, or compressed air system, or any service-system capable of providing a source of suction.

Another advantageous feature of the present mechanical water-level controlling assembly resides in the high head to which it will pump, and hence well away from the immediate area of the manhole in which it is located, this again in marked contrast to the case with conventional electric sump pumps. Still another feature resides in the fact that by the use of the mechanical assembly herein described, escaping hot water and steam cannot overheat the low-fusable bearings and low-fusable wiring necessarily associated with conventional electric pumps and whereby the same are frequently rendered inoperative.

With the foregoing in view, and all those objects, purposes or advantages which may become apparent from consideration of this disclosure and specification, the present invention consists of the inventive concept embodied in the method, process, construction, arrangement of parts, or new use of any of the foregoing, as herein particularly exemplified in one or more specific embodiments of such concept, reference being had to the accompanying figures in which:

FIGURE 1 is a side elevation depicting the invented system as arranged within a typical manhole.

FIGURE 2 is a plan view of the invented assembly.

FIGURE 3 is a perspective representation of the invented assembly shown in association with a conduit confined source of suction.

In the drawings, like characters of reference designated similar parts in the several figures.

The present invention performs the operation of a conventional electrical sump-pump, but, instead of employing an electric motor as the source of power for operating a mechanical pump, functions in co-operation with a conduit-confined source of suction such as generally designated 10.

This source of suction may typically consist of a branch or branch conduit of a steam piping system. Alternatively, it may consist of a branch of a water supply system wherein of course the water is under pressure for use when needed. Thus in greater detail the conduit-confined source of suction may embody an open-ended primary branch section or conduit 11 containing therein a normally closed valve 12. On the open-ended or output side of the valve is a secondary pipe section 13, angled as at 14, or otherwise, according to circumstances, but in any event including a T-throat fitting 15 connected to which, and downwardly extending is a suction or draw-off pipe 16. The open-ended discharge pipe portion 17 also connected to fitting 15 is to be understood as exiting to any convenient point of overflow discharge of the sump-contents 18 whenever these should rise undesirably high within the sump 19 extending below the bottom of the manhole generally designated 20.

From the foregoing it is to be understood that when valve 12 is opened, as indicated by phantom lines in the accompanying FIGURE 1, fluid held back within the primary branch 11 is free to rush through the secondary pipe 13 and through the fitting 15 which is a conventional fitting, in virtue of which a vacuum is caused in draw-off pipe 16 as a result of which excess water 18 is sucked up through the pipe to be carried off through fitting 15 and through discharge pipe section 17. The mechanism by reason of which the valve 12 may be actuated under the aforesaid circumstances which, being conventional, need not be described.

Mounting structure collectively designated 21 is suspended from the secondary pipe section 13 as by means of the T-coupling 22. The mounting or supporting structure 21 takes the form of a generally elongated clevis characterized by having a pair of downwardly extending, spaced and parallel sides 23 held in such spaced relationship by means of the distance-piece 23' at the upper end thereof, and by bearing pin 24 at the lower end.

Between the upper and lower ends of the supporting means 21 a toggle action generally designated 25 is located. This toggle comprises a first arm 26 and a second arm 27. Both arms are pivotally connected at adjacent ends to supporting means 21 by means of the bearing pin 28 which extends through the inner and outer bearing-clevises 29 and 30 secured to the inner ends of arms 27 and 26 respectively.

The distal end of arm 26 is provided with the split bearing 31 provided with an elongated bearing pin 32 which transfixes the upper end of float element suspension rod 33. Float element 34 is attached to the lower end of this rod.

Secured as by welding or the like to second arm 27 is a valve lever actuating plate 35. Upon the distal end of second arm 27 is an elongated, transversely extending anchor bolt 36 substantially similar to element 32. To the ends of elements 32 and 36, tension springs 37 are attached.

Projecting outwardly and upwardly from supporting means 21, and below the first and second arms 26 and 27 to limit the downward rotation thereof under the influence of springs 37, are means 38 and 39 in the form of an elongated plate and bar respectively both being welded between the sides 23 for rigidity. As may readily be observed from the accompanying FIGURES 1 and 3, arms 26 and 27 are maintained in superior reflex angular relationship in virtue of the means or stops 38 and 39.

Means 40 are also provided to limit the upward movement of arm 26. This also consists of an elongated bar which is secured as by welding between the sides 23. Excessive upward movement of arm 27 is prevented by the valve actuating lever 41 as will presently become apparent.

To prevent sway of the rod 33, a stabilizing link 42 is provided, the same extending between bearing 24 and the clevis 43 secured as by welding to link 33. Thus arm 26 and link 42 should be approximately parallel for actuation as a parallelogram with rod 33 and in connection with the sides 23 as will presently become apparent.

The structure of the present invention and its environment having now been described, the operation thereof will clearly be apparent. Essentially the arms 26 and 27, together with the pair of springs 37 function as a toggle action. Thus, when the water level 18 rises undesirably within sump 19, float element 34 exercises an upward force upon the distal end 31 of arm 26. When arm 26 is forced upwardly against the resistance of springs 37 to such an extent that it has rotated past the parallel with respect to arm 27, the springs 37 cause the arm 27 to snap sharply clockwise upwardly so that plate 35 hits the valve actuating lever 41 and moves the same upwardly into the phantom line position of the accompanying FIGURE 1.

In such position the valve 12 is of course open and the fluid in primary pipe section 11 rushes therepast to cause vacuum in draw-off pipe 16 as already described. Hence the water lever 18 is gradually lowered and the weight of the float element 34 causes same to subside downwardly. Such weight again overcomes the resistance of springs 37 so that arm 26 is rotated clockwise. When it has subsided to the point where it is just past parallel with the elevated arm 27, the latter is caused to snap counter-clockwise under the influence of springs 37 to assume again the position depicted in full lines in the accompanying figures.

It will of course be appreciated that the open-ended conduit 11 is connected to any conventional pressurized fluid conducting piping system, and so connected by conventional means in view of which such piping system need not be described. It should be added in conclusion however that the conduit 11 is well adapted for conventional connection to an underground piping system described in Canadian Patent No. 770,410 dated Oct. 1, 1967.

What is claimed is:

1. A snap action toggle assembly comprising in combination
 (i) elongated vertical supporting means in the form of a clevis having spaced and parallel sides and an open space therebetween, and
 (ii) a toggle action, said toggle action embodying a first and a second arm, said arms being pivotally connected between said sides, each of said arms being elongated relative to the proportions of said assembly, said arms each being pivotally connected for rotation in a vertical plane at adjacent ends to said supporting means and projecting from opposite sides thereof normally in obtuse angular relationship, means for limiting downward rotation of said arms, and spring means, normally in tension, existing between the distal ends of said arms, said spring means being connected to said ends, a stabilizing link projecting substantially horizontally from said clevis and a rod extending between the distal end of said link and the distal end of said first arm, said stabilizing link being spaced from said first arm, substantially parallel therewith, said first arm, stabilizing link, clevis and rod generally forming a parallelogram.

References Cited

UNITED STATES PATENTS

| 1,760,382 | 5/1930 | Teesdale | 200—67 X |
| 1,796,828 | 3/1931 | Clingman. | |
| 2,257,793 | 10/1941 | Frank | 200—67 X |
| 2,611,048 | 9/1952 | Reading | 200—67 X |

MILTON KAUFMAN, *Primary Examiner.*